Dec. 12, 1961 A. GOETZ 3,012,827
GAS SUPPORTED BEARING
Filed Jan. 6, 1959

INVENTOR.
ALEXANDER GOETZ
BY
ATTORNEYS

United States Patent Office 3,012,827
Patented Dec. 12, 1961

3,012,827
GAS SUPPORTED BEARING
Alexander Goetz, Altadena, Calif., assignor to California Institute Research Foundation, Pasadena, Calif., a corporation of California
Filed Jan. 6, 1959, Ser. No. 785,280
3 Claims. (Cl. 308—35)

This invention relates to gas bearings and included in the objects of this invention are:

First, to provide a gas bearing which under operating conditions exhibits far less friction than that produced by high quality bearings of the roller or ball bearing type.

Second, to provide a gas bearing which functions at high surface speeds between its relatively moving elements and utilizes a ball or roller bearing to permit establishment of the optimum operating conditions; that is, the companion ball or roller bearing is utilized during starting or stopping of the shaft journalled by the gas bearing.

Third, to provide a gas bearing which requires no external pump or other means for forcing a radial stream into inter face of bearing.

Fourth, to provide a gas bearing wherein the molecules of the gas layer between the relatively moving confronting surfaces of the bearing are converted from their statistical or thermal motion into a uni-directional movement and at such low angular relation with the opposing wall surface that the momentum exchange of the molecules is greatly reduced and therefore the energy transfer to the bearing surfaces is greatly reduced.

With the above and other objects in view as may appear hereinafter, reference is directed to the accompanying drawings in which.

Figure 1:
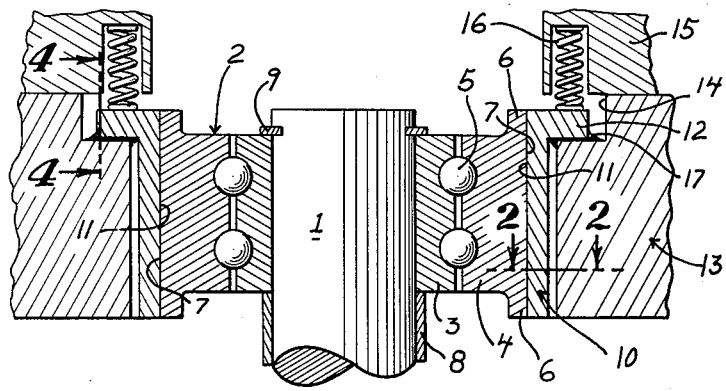
FIGURE 1 is a substantial, diagrammatical and fragmentary sectional view showing a bearing incorporating the invention.
Figure 4:
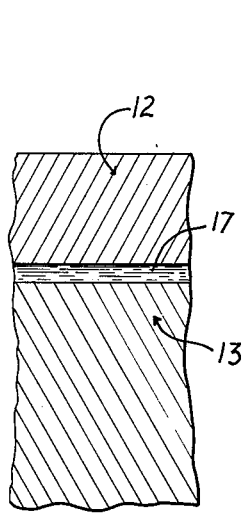
FIGURE 4 is an enlarged fragmentary sectional view taken through 4—4 of FIGURE 1 illustrating the manner in which the outer sleeve of the gas bearing is mounted in a viscous dampening medium.

The bearing is adapted to be installed on a shaft 1 which is preferably located on a vertical axis. Mounted on the shaft is a conventional radial ball or roller bearing 2, preferably a precision type having minimal friction. Conventional seal means not shown may be incorporated in the bearing. The bearing thus includes a conventional inner race 3 and outer race 4 between which are interposed balls 5 or rollers.

As indicated the outer race may be conventional or may be modified to form axially extending flanges 6 and form an outer cylindrical surface 7 which becomes the inner sleeve element of the air bearing itself. Alternatively a suitable sleeve member may be press fitted or otherwise secured to the conventional outer race of the bearing 2.

The inner race of the bearing 2 may be retained on the shaft 1 in any conventional manner as, for example, between a shoulder 8 and a retainer ring 9.

Fitted around the cylindrical surface 7 is an outer sleeve 10 forming a cylindrical gas bearing wall surface 11 confronting the cylindrical surface 7 which also constitutes a gas bearing wall surface.

The outer sleeve 10 provides at one axial end a radially outwardly extending surface 12. The outer sleeve is adapted to be loosely seated within a bore provided in a suitable mounting member 13. The mounting member may be provided with a counter bore 14 to receive the flange 12. Suitably secured to the mounting member 13 is a retainer ring 15 having springs 16 which bear against the flange 12 forcing the flange gently against the step or shoulder provided by the counter bore 14. A viscous dampening fluid 17 such as a relatively thick grease is interposed between the flange 12 and the shoulder or step.

Operation of the bearing structure is as follows: Upon application of a rotational force to the shaft 1 the ball or roller bearing 2 functions; that is, relative rotational movement occurs primarily, if not entirely, between the inner race 3 and outer race 4. As the relative rotation increases, a condition develops wherein the outer race 4 and cylindrical surface 7 rotates relative to the surface 11 of the outer sleeve 10. Apparently when this condition is developed the gas bearing offers less friction than the ball or roller bearing. At this time also there is a substantial drop in the power required to rotate the shaft 1.

Figure 2:
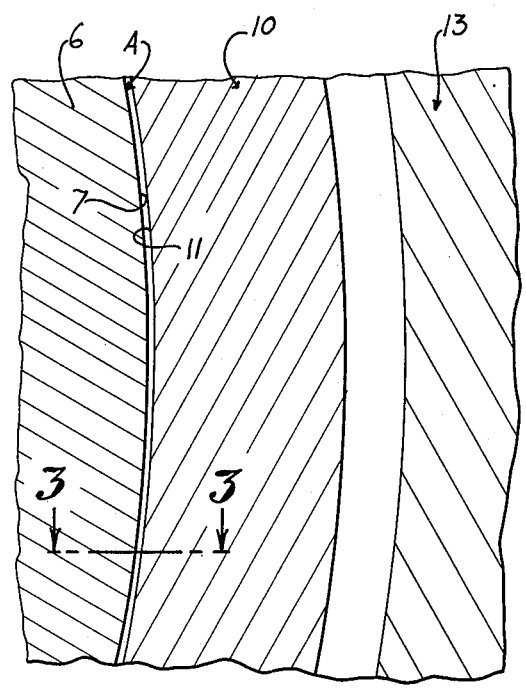
FIGURE 2 is a greatly exaggerated fragmentary sectional view taken through 2—2 of FIGURE 1.
Figure 3:
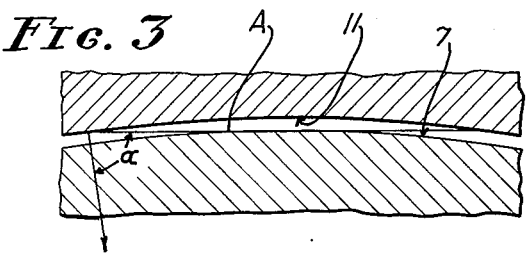
FIGURE 3 is a still further greatly exaggerated fragmentary sectional view taken through 3—3 of FIGURE 2 showing particularly the confronting surfaces of the gas bearing.

It is essential in order to attain this condition that the confronting gas bearing wall surfaces 7 and 11 be contacted directly by the ambient air or gas and free of contamination by any liquid or solid particles. The outer sleeve 10 tends under optimum conditions of operation to assume a position concentric with the cylindrical surfaces 7 so that the gas or air space as represented by A in FIGURES 2 and 3 is uniform over the periphery of the cylindrical surface 7.

Tests have been conducted utilizing a pair of high quality ball bearings; namely, New Departure 7R14, each having an inner or shaft diameter of 0.876, an outer diameter of 1.8495″ and an axial length fo 0.500″. Fitted on the outer surfaces of the bearings was a polished steel sleeve having an outside diameter of 2.040″±.00005″ and a length of one inch. This sleeve fitted within an outer bronze sleeve having an inside diameter to provide a clearance between the surfaces, corresponding to the air bearing surfaces 7 and 11 of .001″±.0002″.

The shaft was driven by a motor capable of 30,000 r.p.m. Under starting conditions the motor drew 1.5–2.0 amperes. At approximately 3000 r.p.m., before the gas bearing freed itself entirely, the load was 1.5–1.8 amperes.

After the gas bearing functioned the speed reached 24,000 r.p.m. and the load dropped to 1.05–1.10 amperes.

It appears that in order for this phenomena to occur the following conditions are important:

(1) The confronting wall surfaces should be smooth, though not necessarily polished.

(2) The ratio of the axial length to the diameter is preferably in a range between .5 and 2.0.

(3) The confronting surfaces should be clean, and in particular free of any trace of foreign matter.

(4) The relative velocity between the confronting surfaces should be preferably larger than 10 feet per second.

(5) The geometrical relationship with respect to the angle of critical reflection of the gas molecules from the two cylindrical surfaces 7 and 11 with radii of curvature $R_1$ and $R_2$ respectively results from:

$$\sin \alpha = 1 - \Delta R/R_2 \text{ where } (\Delta R = R_2 - R_1)$$

where ($\Delta R$) represents the radial distance between the confronting surfaces 7 and 11 and ($\alpha$) the angle of incidence from the normal by a molecule at the outer surface 11, after having left the inner surface 7 in a tangential direction.

It appears that the continuous repetition of this momentum transfer will convert the statistical (thermal) motion of the gas molecules into a uni-directional one, in which state the molecules are unable to exchange momentum (and energy) with the wall surfaces. This uni-directional state of the gas molecules is thus characterized by an apparent disappearance of viscosity, and apparently results in greatly reduced heat conductivity.

The actual results obtained are in apparent contradiction to the theoretical friction generated by the gas supported bearing; that is, the prevailing interpretation of gas lubricated bearing is that it functions only by virtue of the substantially lower viscosity of the lubricating gas as compared to the usual liquid lubricants. As stated in H. Drescher "Gleitlager mit Luftschmierung" Z. VDI Bd. 95 (1953) S. 1182/1190, the power (P) exerted by the journal onto the bearing surface is $$P = \frac{V_2}{s} \cdot D \cdot B \pi \eta$$

where D is the normal diameter of the journal (wall 7) or two inches. B is the normal length of the axial bearing surface, or one inch. S is the clearance between journal and bearing (between confronting walls 7 and 11 or .001 inch) V is the velocity of the journal surfaces or 400 r.p.s., $\eta$, is the viscosity of air $1.7 \cdot 10^{-4}$ poise.

Substituting the numerical values given above, $P=12.5$ foot pound/second. Now, if in the actual bearing described, P was in fact equal to 12.5 foot pound/second, then the gas bearing would not function, but instead the ball or roller bearing would function. However, this is not what actually happens, for the gas bearing actually exhibits far less friction than the so called "frictionless" ball or roller bearing.

Now, according to the formula given above, the gas bearing should improve with increase in ($s$) and decrease in (D) and V where $V = \pi \cdot D \cdot$ r.p.s. Stated otherwise P should increase with the cube of D according to the formula $V^2 \cdot D = \pi \cdot D^3 \cdot$ r.p.s. Contrary to this expectation, the performance of the air bearing improves as $s$ is reduced (within limits of a free fit) and the larger D and V become.

For example, reduced friction resulted when S was reduced from between .002 to .001, and D was increased from 2–.004 inches to 2–.002 inches. But according to the accepted theory of air bearings the lower loss P should have increased 26.4 times.

I claim:
1. A gas bearing, comprising: a shaft; an anti-friction bearing having inner and outer races and rotating elements therebetween; a journal portion carried by the outer race of said bearing; a bearing element surrounding said journal portion, said journal portion and bearing element defining confronting but spaced cylindrical surfaces, means for mounting said bearing element for limited radial displacement to facilitate positioning of said bearing element in concentric relation with said journal portion; and a viscous dampening medium for said bearing element.

2. A gas bearing, comprising: a first bearing having radially inner and outer races and rolling elements therebetween; a second bearing concentric with said first bearing and having radially inner and outer races, said races presenting confronting cylindrical surfaces, the space between said surfaces being free of liquid and containing solely a gaseous medium; the inner race of one of said bearings and the outer race of the other of said bearings being connected to a rotating member and the other to a non-rotating member, whereby such frictional force as may be transmitted between said members passes in sequence through said first and second bearings, and a viscous dampening medium between said non-rotating member and the race connected thereto.

3. A gas bearing, comprising: an anti-friction bearing having planetary rotating elements therein; a sleeve bearing in concentric relation with said anti-friction bearing; defining concentric contiguous relatively rotating walls, the space between said walls being free of liquid and containing solely a gaseous medium; a shaft journalled within the inner of said bearings; a fixed support surrounding the outer of said bearings in spaced relation therewith to permit limited radial displacement of said bearings; and including an annular axially directed face, said outer bearing including a mating axially directed face; and a viscous dampening medium between said faces.

References Cited in the file of this patent
UNITED STATES PATENTS

| | | |
|---|---|---|
| 2,556,020 | Williams | June 5, 1951 |
| 2,623,353 | Gerard | Dec. 30, 1952 |
| 2,864,552 | Anderson | Dec. 16, 1958 |
| 2,872,254 | McNaughton et al. | Feb. 3, 1959 |
| 2,889,474 | Macks | June 2, 1959 |

OTHER REFERENCES

"Air Bearings, Low Friction" by D. D. Fuller; Lubricating Engineer, December 1953, volume 9, Number 6, pages 298–301.